E. H. BINGHAM & T. TOMINSKI.
VEHICLE TIRE.
APPLICATION FILED OCT. 12, 1910.
1,029,263.
Patented June 11, 1912.
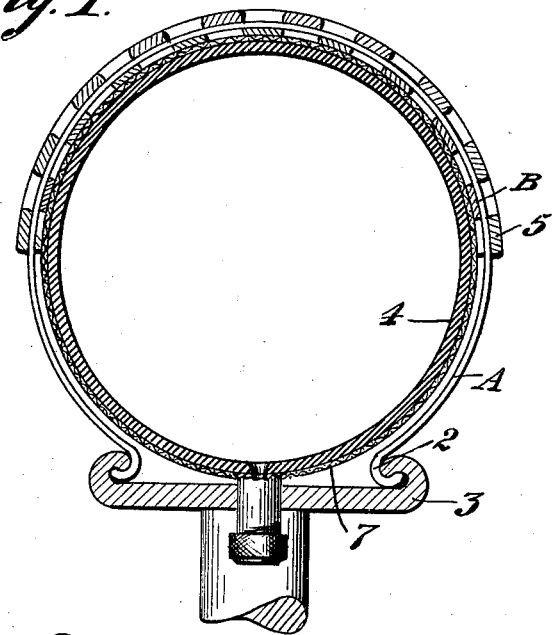
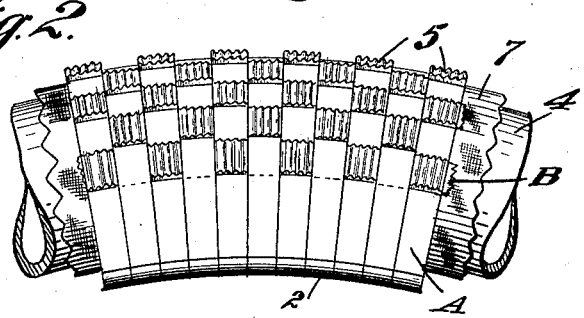
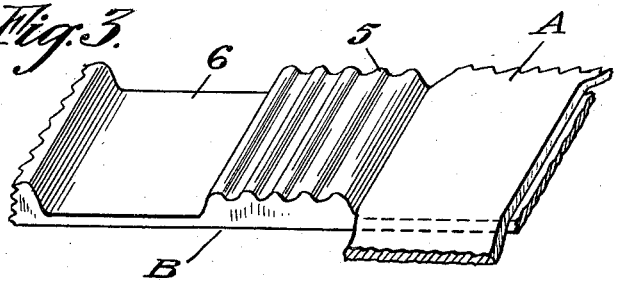
WITNESSES
INVENTORS
EUGENE H. BINGHAM
AND
THEODOR TOMINSKI
THEIR ATTORNEY.

UNITED STATES PATENT OFFICE.

EUGENE H. BINGHAM AND THEODOR TOMINSKI, OF SAN FRANCISCO, CALIFORNIA.

VEHICLE-TIRE.

1,029,263. Specification of Letters Patent. Patented June 11, 1912.

Application filed October 12, 1910. Serial No. 586,737.

*To all whom it may concern:*

Be it known that we, EUGENE H. BINGHAM and THEODOR TOMINSKI, both citizens of the United States, residing in the city and county of San Francisco and State of California, have invented new and useful Improvements in Vehicle-Tires, of which the following is a specification.

The invention relates to vehicle tires, and pertains especially to a resilient tire for use on automobiles, and the like.

The object of the invention is to provide a metal substitute for puncturable pneumatic tires; also to provide an armor for use on pneumatic tires already in use.

The invention consists of the parts and construction and combination of parts as hereinafter more fully described and claimed having reference to the accompanying drawings, in which—

Figure 1 is a cross section showing the application of the invention. Fig. 2 is a side elevation showing the application of the armor to a tire. Fig. 3 is a perspective showing the construction of the armor feature.

In the construction of our tire and armor we employ interwoven spring metal bands or strips A and B, woven in a close mesh similar to a basket weave. The strips A composing the warp, extend crosswise and terminate in hooks 2 which are adapted suitably to be embraced by an appropriate flanged rim 3. The woof strands or strips B extend circumferentially of the wheel and are interwoven with the strands A, basket fashion, so that the strands A and B present a closely woven metallic fabric structure entirely covering the tread portion of the tire and extending down a sufficient distance at the sides to protect the inflatable tube 4, which is suitably housed within the armor.

To give wearing strength and traction and to prevent side slip, the tread portions of the interwoven strips B are preferably constructed as shown in Fig. 3; that is to say, the exposed portion of each strip is raised and corrugated as shown at 5, the intermediate portions 6 being made smooth and thinner where overlaid by the corrugated portion of the other strip A. The alternate depressions 6 and exposed portions 5 give each band or strip an undulating appearance.

The warp or crosswise extending members A are substantially U-shaped, while the circumferentially extending or woof members B are in the shape of continuous rings. In practice, these strips A and B are about one-half an inch wide, more or less, and are sufficiently thin to have the desired degree of resiliency. If desired, there may be arranged between the inner tube 4 and the armor a fabric lining as indicated at 7, to protect the tube from chafing. A woven spring metallic fabric of this sort having inherent within it the power of recovering its shape when pressure is released on it, and constructed and operated as herein described, constitutes the substitute of the usual expensive, puncturable outer casings, because it in itself forms the casing. Furthermore, it is practically indestructible and nonpuncturable.

Having thus described our invention, what we claim and desire to secure by Letters Patent is—

1. A vehicle tire comprising a casing formed of two series of strips having inherent power of recovery, said strips crossing each other and the strips of one series having alternate portions thicker than intermediate portions thereby forming alternate tread portions and intermediate depressions, the said depressed portions being overlaid by the other strips and the tread portions being arranged in staggered relation.

2. A vehicle tire comprising a casing formed of two series of interlaced metal strips flat on one side, one series of strips undulating on the outer side to form alternate thickened tread portions and intermediate depressions, the depressed portions of the strips underlying the strips of the other set at the point of crossing of said strips.

3. The combination with an inflatable tube and a clencher rim of an armor composed of crosswise extending U-shaped spring metal strips having terminal hook members engageable with the rim, and circumferential spring rings interwoven with the crosswise extending members, and the tread portions of said circumferentially extending members being thickened and corrugated.

In testimony whereof we have hereunto set our hands in the presence of two subscribing witnesses.

EUGENE H. BINGHAM.
THEODOR TOMINSKI.

Witnesses:
CHARLES EDELMAN,
CHARLES SIGOURNEY.

Copies of this patent may be obtained for five cents each, by addressing the " Commissioner of Patents, Washington, D. C."